(No Model.) 2 Sheets—Sheet 1.

E. K. BROWN.
DYNAMO ELECTRIC MACHINE AND ELECTRIC MOTOR.

No. 446,092. Patented Feb. 10, 1891.

Witnesses:
O. L. Lundgren
D. H. Haywood

Inventor:
Edward K. Brown
by his Attorneys
Brown & Griswold

UNITED STATES PATENT OFFICE.

EDWARD K. BROWN, OF BROOKLYN, NEW YORK, ASSIGNOR, BY DIRECT AND MESNE ASSIGNMENTS, TO HIMSELF AND GEORGE PHILLIPS, OF SAME PLACE.

DYNAMO-ELECTRIC MACHINE AND ELECTRIC MOTOR.

SPECIFICATION forming part of Letters Patent No. 446,092, dated February 10, 1891.

Application filed November 1, 1889. Serial No. 328,892. (No model.)

*To all whom it may concern:*

Be it known that I, EDWARD K. BROWN, of Brooklyn, in the county of Kings and State of New York, have invented a certain new and useful Improvement in Dynamo-Machines and Electric Motors, of which the following is a specification.

My improvement relates to special methods of construction of dynamo-machines and electric motors, and particularly to such machines having laminated pole-pieces.

I will describe in detail a dynamo-machine and electric motor, and then point out the novel features in claim.

Figure 1:
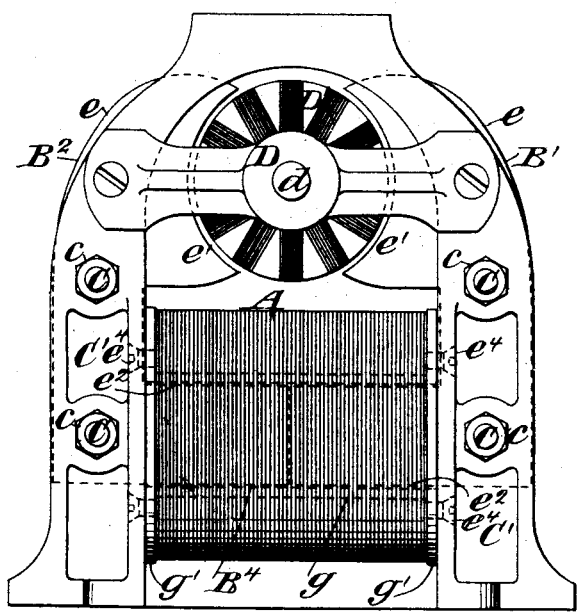
Figure 2:
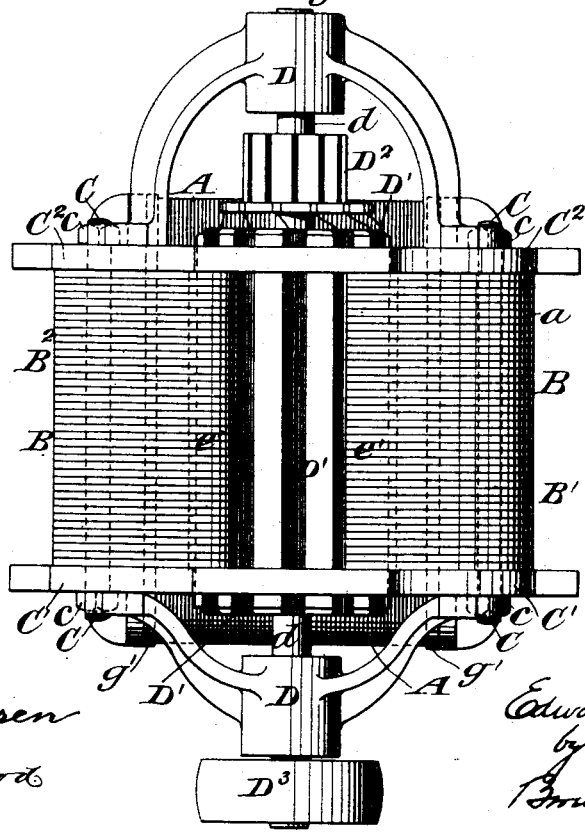
Figure 4:
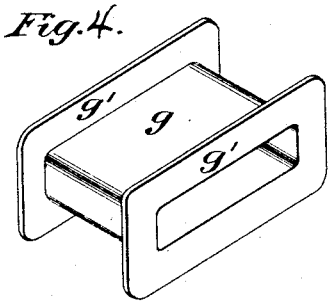
Figure 3:
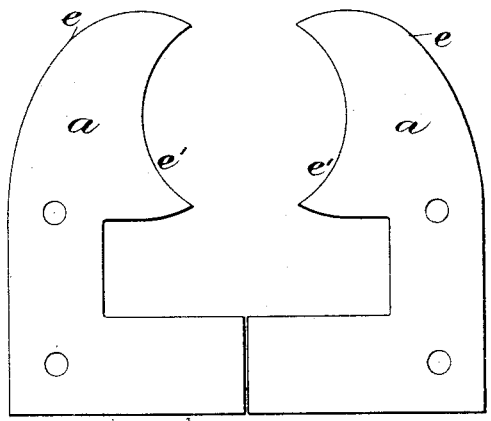

In the accompanying drawings, Figure 1 is an end view of a dynamo-machine embodying my improvement. Fig. 2 is a plan or top view of the same. Fig. 3 is a view of one set of the laminæ detached. Fig. 4 is a view in detail of one of the coil-frames.

Similar letters of reference designate corresponding parts in all the figures.

A designates a field-magnet coil, and B a field-magnet. The field-magnet is here shown as composed of two sections $B'$ and $B^2$, each made up of laminated plates $a$. Each of the laminæ of the sections has an upwardly-extending portion $e$, from which there extends inwardly a portion $e'$, having a curved inner edge which partially surrounds the armature $D'$. The latter rotates therefore within the upper portion of the field-magnet. The lower portions of the laminæ of the field-magnet have inwardly-extending portions $e^2$. (Shown more clearly in dotted outline in Fig. 3.) These portions extend centrally through the field-magnet coil A, which latter is arranged beneath the armature $D'$, and extends lengthwise of the machine. They constitute the core of the magnet. In this case the plates $C'$ $C^2$ are securely clamped against the ends of the field-magnet by means of bolts C, which pass, as shown, directly through the laminated portions of the field-magnet; but they may pass upon the outside thereof. Nuts $c$ secure the parts together. In this case the shaft of the armature is journaled in bearing-pieces D, which are secured directly to the plates $C'$ $C^2$ by means of screws. These bearing-pieces may, however, be cast with the plates $C'$ $C^2$.

The field-magnet coil is first secured to the end pieces $C'$ $C^2$ by means of screws $e^4$. The laminated sections $B'$ $B^2$ are then passed inwardly from opposite sides until the core-pieces $e^4$ extend into the field-magnet coil sufficiently far to meet in its center. The laminated sections are then secured by the bolts C. The armature is then put in place.

The magnets of the field are formed by winding coils upon frames—such, for instance, as is shown in Fig. 4. These frames have central barrel-like portions $g$ and flanged portions $g'$ at their ends. The coils are wound upon the barrel-like portions and between the flanges. This affords provision for securing the magnets in position more firmly by means of the screws $e^4$, which engage the flanged portions of the frame of the magnet, and also renders the magnet easily detachable from the frame.

What I claim as my invention, and desire to secure by Letters Patent, is—

In a dynamo-electric machine, the combination of a coil and two similar sections composed of laminæ of substantially the same form, each of which sections constitutes a pole-piece and part of a core, the parts of the two sections constituting the core being received within the opposite ends of the coil, substantially as set forth.

EDWARD K. BROWN.

Witnesses:
 JAMES D. GRISWOLD,
 GEO. BARRY.